(12) United States Patent
Thompson et al.

(10) Patent No.: US 9,531,038 B2
(45) Date of Patent: Dec. 27, 2016

(54) SYSTEM AND METHOD OF CELL BLOCK VOLTAGE ANALYTICS TO IMPROVE BALANCING EFFECTIVENESS AND IDENTIFY SELF-DISCHARGE RATE

(71) Applicant: Dell Products, LP, Round Rock, TX (US)

(72) Inventors: Richard C. Thompson, Cedar Park, TX (US); Nikhil M. Vichare, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 529 days.

(21) Appl. No.: 13/955,591

(22) Filed: Jul. 31, 2013

(65) Prior Publication Data

US 2015/0037624 A1 Feb. 5, 2015

(51) Int. Cl.
*H01M 10/42* (2006.01)
*H01M 10/48* (2006.01)
*H02J 7/00* (2006.01)

(52) U.S. Cl.
CPC ......... *H01M 10/425* (2013.01); *H01M 10/482* (2013.01); *H02J 7/0014* (2013.01); *H01M 2010/4271* (2013.01)

(58) Field of Classification Search
CPC .............. H01M 10/425; H01M 10/485; H01M 2010/4271; H01M 10/482; H02J 7/0014
See application file for complete search history.

(56) References Cited

U.S. PATENT DOCUMENTS

| | | | |
|---|---|---|---|
| 5,684,404 A | 11/1997 | Millar | |
| 8,339,100 B2 * | 12/2012 | Li | H01M 10/42 320/118 |
| 2006/0261816 A1 | 11/2006 | Rocher et al. | |
| 2011/0029265 A1 | 2/2011 | Martens | |
| 2011/0316483 A1 * | 12/2011 | Zhang | H01M 10/441 320/118 |
| 2013/0158915 A1 | 6/2013 | Humla | |

FOREIGN PATENT DOCUMENTS

| | | |
|---|---|---|
| DE | 43 16 471 A1 | 11/1994 |
| WO | WO 2009/093999 A1 | 7/2009 |
| WO | WO 2011/041029 A1 | 4/2011 |

\* cited by examiner

*Primary Examiner* — Ula C Ruddock
*Assistant Examiner* — Thomas Parsons
(74) *Attorney, Agent, or Firm* — Larson Newman, LLP

(57) ABSTRACT

A battery management unit includes a cell balancing module to perform cell balancing between a cells in a battery cell stack, and a controller operable to determine, during a first charge cycle, that the first cell has reached an over-voltage threshold before the second cell, to determine, during a discharge cycle, that the first cell has reached an under-voltage threshold before the second cell, to identify the first cell as having a lower capacity than the second cell based upon the determination that the first cell reached the over-voltage threshold before the second cell and upon the determination that the first cell reached the under-voltage threshold before the second cell, and to prevent, during another charge cycle, the cell balancing module from performing cell balancing on the first cell based upon the first cell being identified as having the lower capacity than the second cell.

19 Claims, 5 Drawing Sheets

SYSTEM AND METHOD OF CELL BLOCK VOLTAGE ANALYTICS TO IMPROVE BALANCING EFFECTIVENESS AND IDENTIFY SELF-DISCHARGE RATE

FIELD OF THE DISCLOSURE

This disclosure relates generally information handling systems, and more particularly relates battery systems in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system and other systems can be powered using a battery pack.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
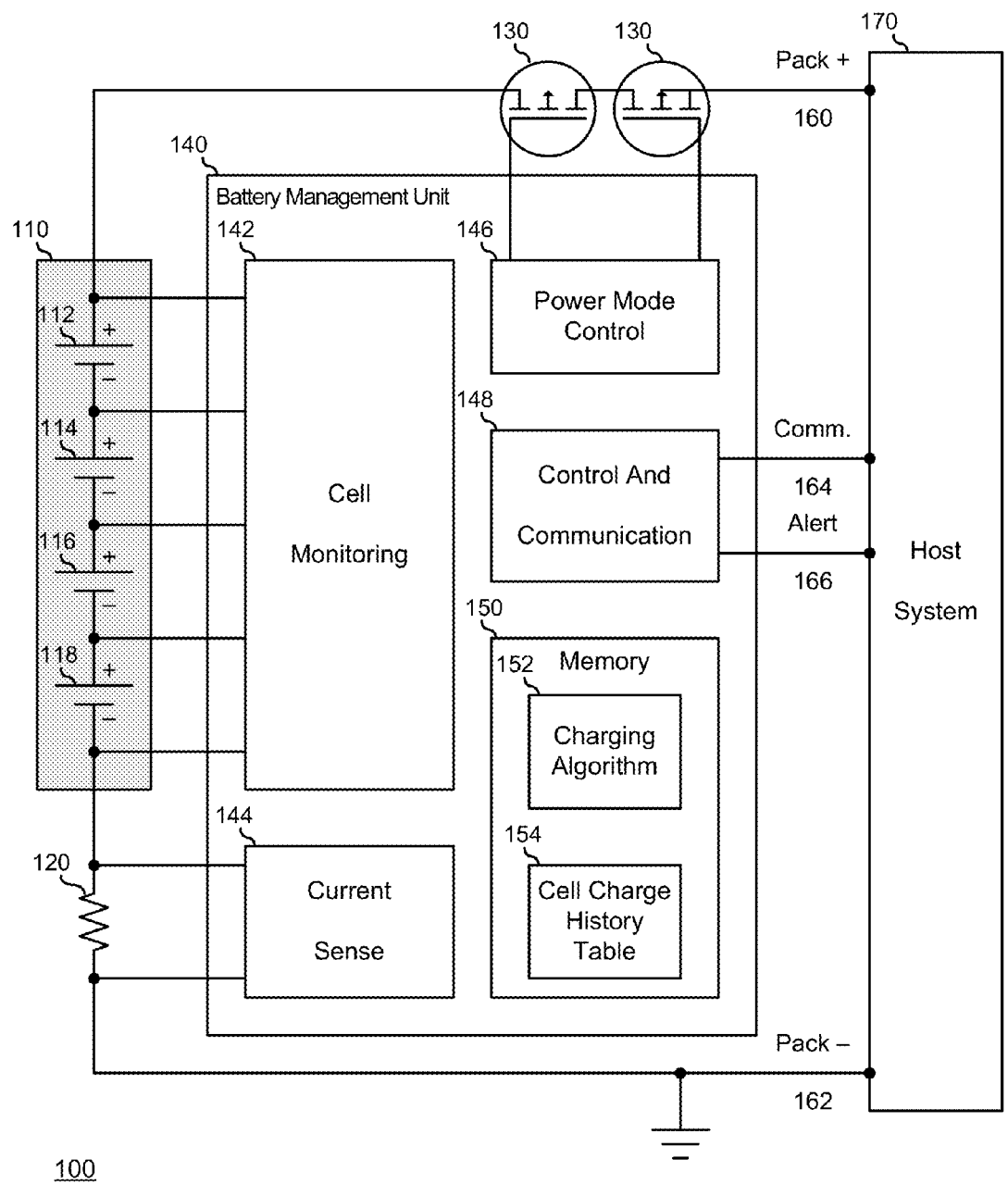
FIG. 1 is a block diagram illustrating a battery system according to an embodiment of the present disclosure.

FIG. 1 illustrates a battery system 100 for powering a host system 170 and including a battery cell stack 110, a current sense resistor 120, power FETs 130, and a battery management unit (BMU) 140. Battery cell stack 110 includes cell blocks 112, 114, 116, and 118. Cell blocks 112, 114, 116, and 118 represent one or more battery cells that are arranged together to provide a single voltage level to battery cell stack 110. For example cell blocks 112, 114, 116, and 118 can each include individual battery cells arranged in a serial configuration to provide a larger voltage level, in a parallel configuration to provide a larger current capability and a greater capacity, or in a combination thereof. Battery cell stack 110 is illustrated as having four cell blocks 112, 114, 116, and 118, but this is not necessarily so, and battery cell stack 110 can include more or less than four cell blocks, as needed or desired. As used herein, a battery pack includes a battery cell stack of two or more cell blocks configured in a combination of serial and parallel topologies, an enclosure, and a connector, and can include a battery management unit such as BMU 140.

Current sense resistor 120 is a low resistance resistor that provides a small voltage drop that is measurable by BMU 140 to determine the amount of current being provided by battery cell stack 110 when the battery cell stack is discharging, and the amount of current being provided to the battery cell stack when the battery cell stack is charging. In a particular embodiment, current sense resistor 120 is provided in conjunction with a fuse to protect battery cell stack 110 and host system 170 from an over current condition. An example of current sense resistor 120 includes a resistor with a resistance of between 5 and 20 mili-ohms (m Ω), or a resistor with another resistance, as needed or desired. Power FETs 130 operate as switches to connect battery cell stack 110 to a load when battery system 100 is in a discharge mode, and to a power source when the battery system is in a charge mode. Battery system 100 provides a battery voltage to host system 170 between a battery cell stack positive terminal 160 and a battery cell stack negative terminal 162, where the negative terminal is typically associated with a circuit ground potential. For example, in the discharge mode battery system 100 provides battery power at positive terminal 160 and a return at negative terminal 162, and in charge mode the battery system receives power at the positive terminal and a return at the negative terminal.

BMU 140 includes a cell block monitoring module 142, and current sense module 144, a power mode control module 146, a control and communication module 148, and a memory module 150. BMU 140 operates to manage the operation of battery cell stack 110, to control charging and discharging of the battery cell stack, to protect the battery cell stack, to monitor and report the state of cell blocks 112, 114, 116, and 118, to balance the cell blocks, and to communicate status and control information related to the operation of the battery system. Cell block monitoring module 142 performs cell block balancing, managing the selective discharging of one or more of cell blocks 112, 114, 116, and 118 in order to maximize the capacity of battery cell stack 110 and make more of the energy stored in the cell blocks available for use, and to increase the lifespan of the battery cell stack.

In a particular embodiment, one or more of cell blocks 112, 114, 116, and 118 can have different energy storage capacities or have different discharge rates, even if the cell blocks are all of the same type. Cell block monitoring module 142 operates to detect the state of charge on each of cell blocks 112, 114, 116, and 118. In the charging mode, cell block monitoring module 142 operates to detect when each of cell blocks 112, 114, 116, and 118 have reached a maximum charge level. If a particular cell block 112, 114, 116, or 118 reaches the maximum charge level before the other cell blocks, cell block monitoring module 142 performs cell block balancing by halting the charging of all of the cell blocks and to partially discharge the particular cell block by a predetermined amount and then resuming the charging of all of the cell blocks. If the particular cell block 112, 114, 116, or 118, or another cell block then reaches the maximum charge level before the other cell blocks, then cell block balancing module 142 repeats the selective discharge of the cell blocks that have reached the maximum charge level by the predetermined amount, and then resumes charging all of the cell blocks. This cycle is repeated by cell block monitoring module 142 until all cell blocks 112, 114, 116, and 118 are charged to the maximum charge level. In this way, none of cell blocks 112, 114, 116, or 118 are overcharged, and all of the cell blocks achieve state of charge that is at the maximum charge level. In a particular embodiment, cell block monitoring module 142 provides passive cell block balancing where the selective discharge of cell blocks 112, 114, 116, and 118 is done by connecting the particular cell blocks to discharge resistors until the state of charge is lowered by the predetermined amount. In another embodiment, cell block monitoring module 142 provides active cell block balancing where the selective discharge of cell blocks 112, 114, 116, and 118 is done by connecting the cell block with the highest state of charge to the cell block with the lowest state of charge.

Current sense module 144 operates to detect the voltage generated across current sense resistor 120 to determine the amount of current being provided by battery cell stack 110 when the battery cell stack is discharging, and the amount of current being provided to the battery cell stack when the battery cell stack is charging. In the embodiment where current sense resistor 120 is provided in conjunction with a fuse to protect battery cell stack 110 from an over current condition, current sense module 144 operates to detect the over current condition and to trip the fuse. Power mode control module 146 operates to control power FETs 130 to connect battery cell stack 110 to the load when battery system 100 is in a discharge mode and to the power source when the battery system is in a charge mode.

Control and communication module 148 operates to provide a communication channel between BMU 140 and host system 170 that is connected to battery system 100 to provide status and control information to the host system and to receive control parameters from the host system. An illustrative example of host system 170 includes a laptop computer, a cell phone, another mobile device, a desktop computer, a battery backup system, an uninterruptible power supply, another battery operated device or system, or a combination thereof. Control and communication module 148 includes a communication port 164 and an alert signal output 166. In a particular embodiment, communication port 164 operates in accordance with a System Management Bus (SMBus) protocol for sending and receiving system management data. Alert signal 166 represents one or more signals provided from control and communication module 148 to host system 170 to inform the host system of various alert conditions within battery system 100. In a particular embodiment, the signals are discrete logical signals that each represent a different alert condition. In another embodiment, the signals are encoded on a group of logic signals. In yet another embodiment, the signals are not discrete signals, but represent specific fault condition information that is communicated from BMU 140 to host system 170 over communication port 164. An example of an alert condition includes battery cell stack charge full, battery cell stack charge empty, battery cell stack charging, battery cell stack discharging, battery cell stack over temperature, cell block over charge, cell block under charge, cell block balancing, cell block short, over current, another battery system status, or a combination thereof.

Memory module 150 represents a data storage medium of BMU 140 that stores operating programs and data for the BMU and includes a charging algorithm 152 and a cell block charge history table 154. In a particular embodiment, memory module 150 represents a non-volatile random access memory (NVRAM) such as a flash memory that retains the contents of the storage medium when the power is removed from the memory module. Charging algorithm 152 represents the operating program used by BMU 140 to perform the functions and operations as described herein. For example, charging algorithm 152 can include the cell block maximum charge level, the predetermined discharge amount, a cell block minimum charge level, a maximum current level, a maximum battery cell stack temperature, another operating set point, or a combination thereof, as preset values. In a particular embodiment, the preset values can be changed, for example, by receiving updated preset values on communication port 164. Cell block charge history table 154 represents information collected by cell block monitoring module 142 related to the state of charge of each of cell blocks 112, 114, 116, and 118. For example, cell block charge history table 154 can include information related to when each of cell blocks 112 114, 116, and 118 reach the maximum charge level, when each of the cell blocks reach the minimum charge level, whether any of the cell blocks have experience an over charge or an under charge, a rate of discharge for each cell block, or other information related to the status of the cell blocks.

In a particular embodiment, battery system 100 represents a field replaceable unit (FRU) that includes battery cell stack 110, current sense resistor 120, power FETs 130, and BMU 140, and that is installed into host system 170, such as a battery module for a laptop computer. In another embodiment, battery system 100 represents elements that are integrated into a board of host system 170, such as a battery system in an embedded electronic device. In yet another embodiment, battery system 100 represents two or more separate elements, some of which are integrated into host system 170 and others of which are included in an FRU of the host system. In a particular embodiment, one or more elements of BMU 140 are included in host system 170. For example, one or more of the functions and features of memory 150, such as cell block charge history table 154 can be included in a memory of host system 170, and various alerts as described herein can be generated by the host system.

Figure 2:
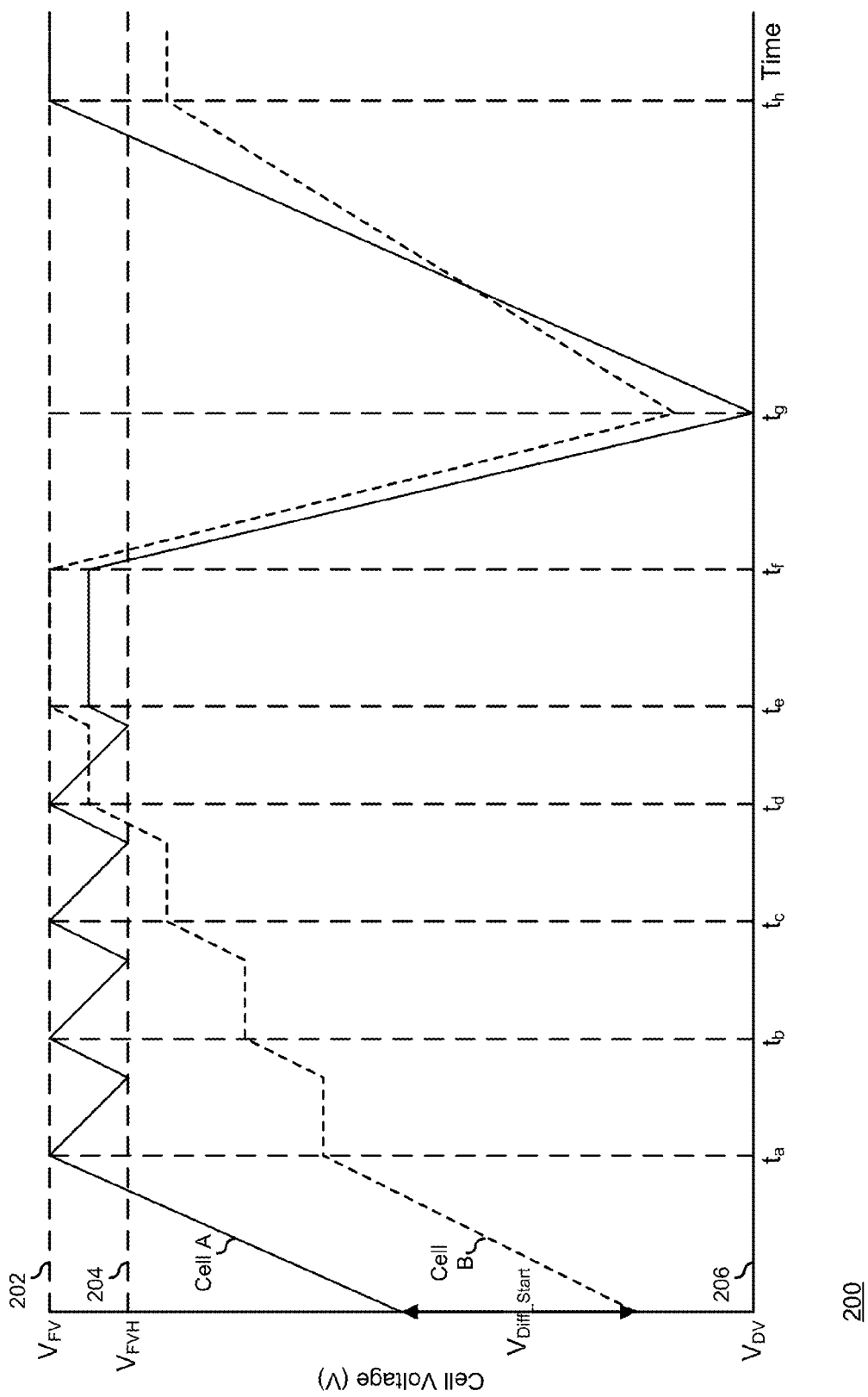
FIG. 2 is a graph illustrating a charge/discharge cycle for a pair of battery cell blocks according to an embodiment of the present disclosure.

FIG. 2. illustrates a charge/discharge cycle for a pair of cell blocks, referred to as cell A and cell B. As illustrated, cell A begins the charge/discharge cycle at a higher state of charge than cell B. As charging commences, the cell block voltage on both cell A and cell B increase. At time $t_a$, cell A reaches a full state of charge that is indicated as a voltage level ($V_{FV}$) 202, the charging of both cells A and B is halted, and cell A is discharged until cell A reaches a lower state of charge that is indicated as an full charge hysteresis level ($V_{FVH}$) 204 and charging of both cells A and B is resumed. The cycle of charging and balancing continues through time $t_b$, $t_c$, and $t_d$, with cell A alternating between $V_{FV}$ 202 and $V_{FVH}$ 204. Finally, at time $t_e$ cell B reaches $V_{FV}$ 202, and charging of both cells is halted because both of cells A and B have achieved a high state of charge. At time $t_f$ a discharge event occurs, such as when a host system is removed from wall power, and cells A and B are discharged until time $t_g$ when cell A reaches an empty state of charge that is indicated as an fully discharged voltage level ($V_{DV}$) 206, and charging is resumed until time $t_h$ when charging is halted. The skilled artisan will recognize that, while the present example shows charging commencing immediately upon cell A reaching $V_{DV}$ 206, this is not necessarily so, and that the cells may linger in a low state of charge until a charge event occurs, such as when the host system is reconnected to wall power.

Note that during the balancing, discharging, and charging cycles shown between times $t_a$ and $t_h$, a cell block charge history table similar to cell block charge history table 154 is recording when cells A and B reach $V_{FV}$, $V_{FVH}$, and $V_{DV}$. In particular, a charging algorithm similar to charging algorithm 152 determines that cell A was the first cell to reach $V_{FV}$ during both charge modes, and was also the first cell to reach $V_{DV}$ during the discharge mode. In an embodiment, when the charging algorithm determines that cell A was the first cell to reach $V_{FV}$ during both charge modes, and was also the first cell to reach $V_{DV}$ during the discharge mode, the charging algorithm further determines that cell A is a low capacity cell, and that bringing cell B to the high state of charge through additional balancing cycles is a waste of energy, and therefore prevents the implementation of additional balancing cycles to bring cell B up to the high state of charge, thereby reducing the amount of energy wasted with unproductive balancing cycles, and the reducing stress on cell A from repeated top-up charging and on cell B for having to achieve the high state of charge during every charge mode. Moreover, the time spent in charge cycles can be reduced by eliminating unnecessary balancing operations. In a particular embodiment, the determination to prevent the implementation of balancing cycles based upon the detection of a low capacity cell block is made in response to a detection of the low capacity cell block. In another embodiment, a particular cell block is not determined to be the low capacity cell block until it has been demonstrated to be the low capacity cell block through several charge-balancing-discharge cycles, in order to more clearly demonstrate that the particular cell block is indeed the cell block with the lowest capacity. If, at a later time, a different cell block devolves into being the cell block with the lowest capacity, the charging algorithm can detect that fact based upon the entries in the cell block charge history table that indicate that the different cell block is then the first cell block reach $V_{FV}$ and $V_{DV}$ during the charge and discharge modes. In another embodiment, a particular cell block is determined to be the low capacity cell block after a partial discharge of the cell block. For example, a charge cycle can be initiated before a particular cell block reaches $V_{DV}$. However, if that particular cell block has the lowest voltage level when the charge cycle is initiated and also reaches $V_FV$ first, then that cell block can be determined to be the low capacity cell block.

Figure 3:
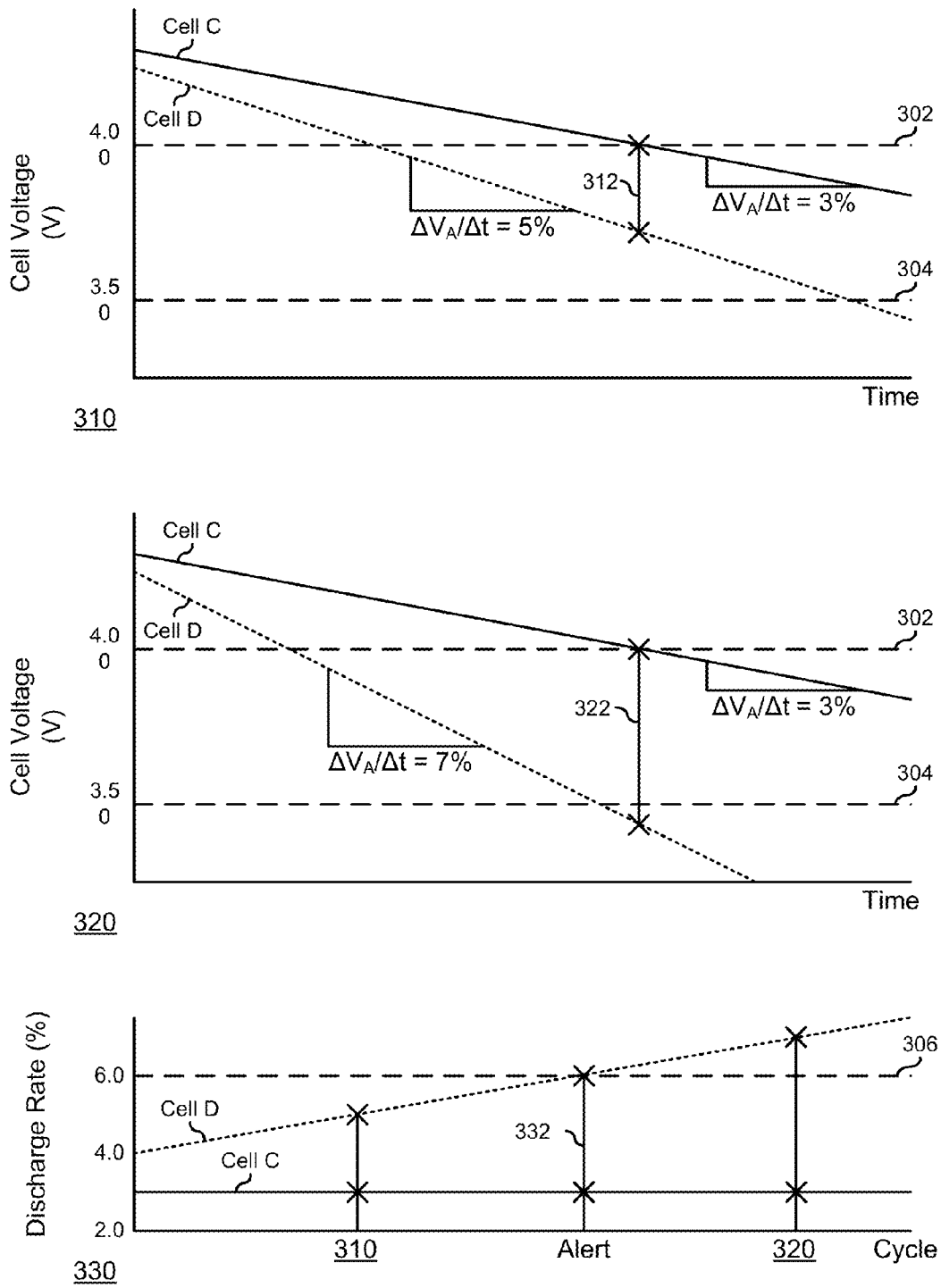
FIG. 3 is a graph illustrating discharge cycles for a pair of cell blocks according to an embodiment of the present disclosure.

FIG. 3. illustrates discharge cycles for a pair of cell blocks, referred to as cell C and cell D. In a particular embodiment, cells C and D are the same cells as cells A and B, but this is not necessarily so. A battery system similar to battery system 100 can include failure criteria, such that when a first cell block reaches a particular voltage level, the battery system is deemed to be permanently failed when a second cell block is below a second voltage level. For example, the battery system associated with cells C and D can have exemplary failure criteria such that when a first cell's state of charge reaches a first failure threshold level 302, then the battery system is deemed to be permanently failed when a second cell's state of charge is less than a second failure threshold level 304. Here, first failure threshold level 302 is set at 4.00 Volts (V), and the second failure threshold level 304 is set at 3.50 V. However, these values are for illustrative purposes, and other failure threshold levels can be used as needed or desired. For example, a failure criteria can be implemented based upon voltages during a charge cycle, such that, when a first cell block reaches a full charge, the battery system is deemed to have failed if a second cell block has not achieved a sufficiently high charge state of charge. In another embodiment, the failure criteria operates similarly to the illustrated example, but is expressed as a maximum delta in the state of charge between a pair of cell blocks. In a first discharge cycle 310, when cell D reaches a state of charge that is equal to failure threshold level 302, cell D has a greater state of charge, so no failure determination is made. However, when cell C reaches a state of charge that is equal to failure threshold level 302, cell C has a lower state of charge, so a failure determination is made, but because cell D's state of charge is greater than failure threshold level 304, the battery system is not deemed to be failing. Or, stated another way, the difference between the state of charge of cell C and the state of charge of cell D, illustrated as a delta 312, is less than a failure threshold that is determined by the difference between failure threshold 302 and failure threshold 304.

Here, a discharge rate for cells C and D are stored in a cell block charge history table similar to cell block charge history table 154. As illustrated, for discharge cycle 310, cell C has a discharge rate of 3% and cell D has a discharge rate of 5%. Here, the discharge rates for cells C and D are illustrative, and actual discharge rates can be determined based upon measured performance of cell blocks in the battery system.

In another discharge cycle 320, which comes after discharge cycle 310, when cell D reaches a state of charge that is equal to failure threshold level 302, cell D again has a greater state of charge, so no failure determination is made. However, when cell C reaches a state of charge that is equal to failure threshold level 302, cell C has a lower state of charge, so a failure determination is made. Here, because cell D's state of charge is less than failure threshold level 304, the battery system is deemed to be failing. Or, stated another way, the difference between the state of charge of cell C and the state of charge of cell D, illustrated as a delta 322, is greater than the failure threshold. When the battery system is determined to have failed, a BMU similar to BMU 140 can blow a fuse to permanently disable the battery system, and can provide a failure indication to the host system. Here also, the discharge rate for cells C and D are stored in the cell block charge history table. As illustrated, for discharge cycle 320, cell C's discharge rate is unchanged at 3% and cell D's discharge rate has increased to 7%.

The discharge rate for cells C and D over multiple cycles 330 illustrate that between discharge cycle 310 and discharge cycle 320, the discharge rate for cell C remained constant at about 3%. On the other hand, the discharge rate for cell D demonstrated an increase over time to the point where, at cycle 320, the battery cell stack was determined to have failed. In a particular embodiment, a BMU similar to BMU 140 operates to implement a discharge rate guardband 306, such that when a cell block is determined to have a discharge rate that is at or greater than the discharge rate guardband, the BMU provides an alert 332 to the host system that indicates that the battery cell stack is in danger of failure. In a particular embodiment, a user of the host system can act upon the alert to replace the battery cell stack or the cell block that triggered the alert, as needed or desired. In a particular embodiment, the indication that a battery cell is in danger of failure is made based upon a comparison of the discharge rate of the cell with previous measurements of the discharge rate for the particular battery cell, and is not based upon a comparison with another battery cell. In another embodiment, the indication that a battery cell is in danger of failure is made based upon a comparison of the discharge rate of the cell with a look-up table value.

The skilled artisan will recognize that discharge cycles 310 and 320 can be illustrative of a discharge into a load of a host system, in which case the timeframe associated with the discharge can be measured in minutes, hours, or another short timeframe as needed or desired. Similarly, the skilled artisan will recognize that discharge cycles 310 and 320 can be illustrative of a self-discharge of the cell blocks when no load is applied to the battery system, in which case the timeframe associated with the discharge can be measured in days, months or another longer timeframe as needed or desired. Note that in this case, the battery pack would need to be in an idle state for an extended period of time in order to determine the level of self discharge, and that the need for data retention for this determination is greater in this case than when the monitoring is of discharges into a load. The skilled artisan will further recognize that the battery analytics as described herein have applicability beyond battery packs in an information handling system, and in particular, are applicable to any battery pack that performs individual cell block monitoring.

Figure 4:
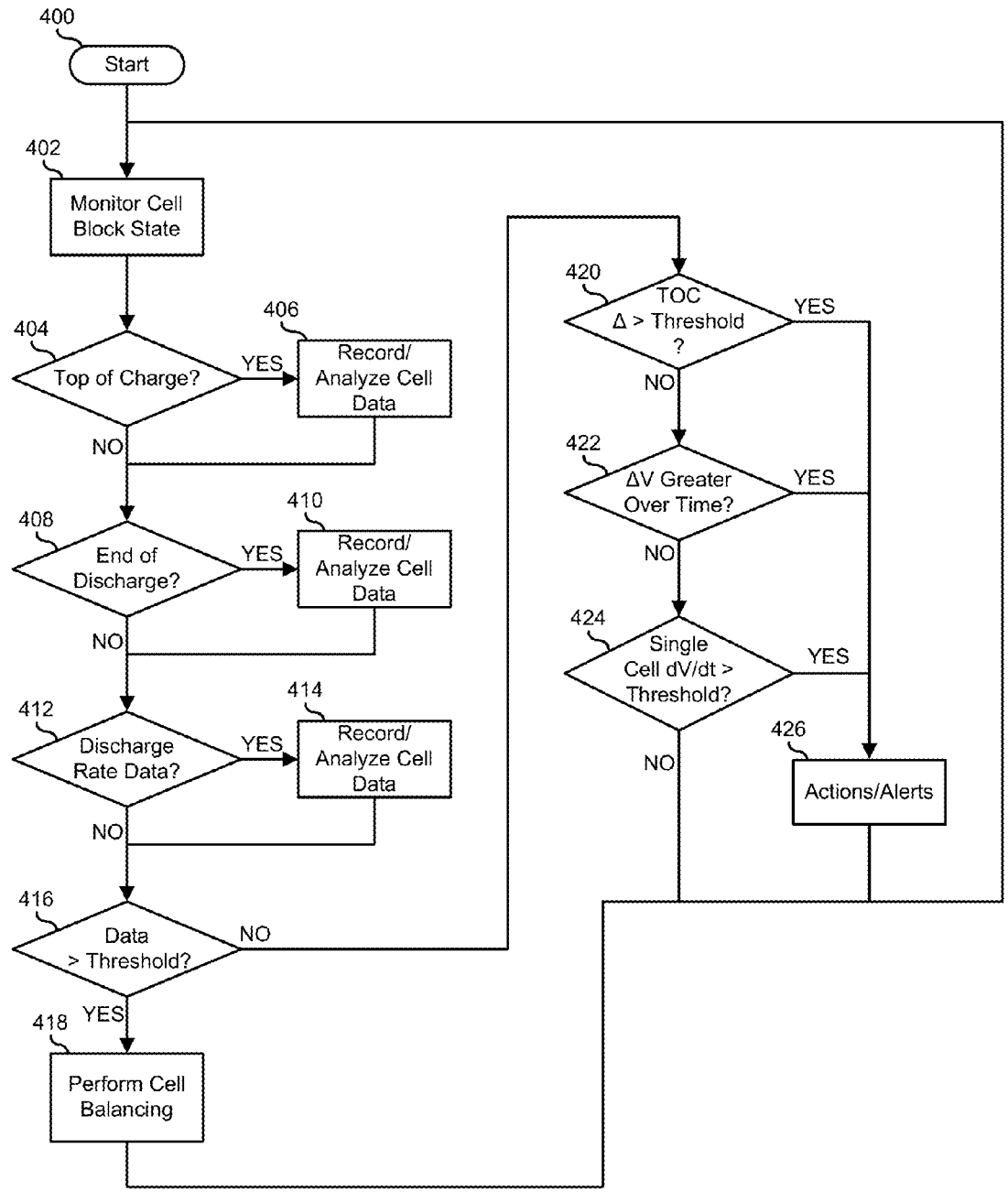
FIG. 4 is a flowchart illustrating a method of cell block voltage analytics to improve balancing effectiveness and identify cell block self-discharge rates according to an embodiment of the present disclosure.

FIG. 4 illustrates a method of cell block voltage analytics to improve balancing effectiveness and to identify cell block self-discharge rates starting at block 400. A BMU similar to BMU 140 monitors the state of cell blocks in a battery cell stack similar to battery cell stack 110 in block 402. A decision is made as to whether or not the battery cell stack is at the top of charge in decision block 404. If so, the "YES" branch of decision block 404 is taken, data related to the cell block status is recorded and analyzed in block 406, and the method proceeds to decision block 408 as described below. The recorded data includes the state of charge for each of the cell blocks in the battery cell stack, the time, a cycle count needed to achieve the maximum state of charge, and other information related to the cell blocks. The analysis includes determining a voltage delta between the cell blocks, a charging and discharging rate for the cell blocks, an indication that a particular cell block is the cell block with the lowest voltage, an indication that a particular cell block is the cell block with the highest voltage, and other analyzed information for the cell blocks. If the battery cell stack is not at the top of charge, the "NO" branch of decision block 404 is taken and a decision is made as to whether or not the battery cell stack is at the end of discharge in decision block 408.

If so, the "YES" branch of decision block 408 is taken, data related to the cell block status is recorded and analyzed in block 410, and the method proceeds to decision block 412 as described below. If the battery cell stack is not at the end of discharge, the "NO" branch of decision block 408 is taken and a decision is made as to whether or not cell discharge rate data is available in decision block 412. If so, the "YES" branch of decision block 412 is taken, the cell discharge rate data is recorded and analyzed in block 414, and the method proceeds to decision block 416 where a decision is made as to whether or not a cell block at the end of discharge in the battery cell stack has a voltage delta that is greater than the hysteresis threshold for cell block balancing in decision block 416. If so, the "YES" branch of decision block 416 is taken, cell block balancing is performed on the battery cell stack in block 418, and the method returns to block 402 where the BMU monitors the state of cell blocks in the battery cell stack.

If a cell block at the end of discharge in the battery cell stack does not have a voltage delta that is greater than the hysteresis threshold for cell block balancing, the "NO" branch of decision block 416 is taken and a decision is made as to whether or not a cell block at the top of charge in the battery cell stack has a voltage delta with another cell block in the battery cell stack that is greater than a predetermined threshold for determining a battery cell stack failure in decision block 420. If not, the "NO" branch of decision block 420 is taken and a decision is made as to whether or not the voltage change for a particular cell block is changing over time in decision block 422. If not, the "NO" branch of decision block 422 is taken and a decision is made as to whether a single cell block's discharge rate is greater than a discharge rate threshold in decision block 420. If not, the "NO" branch of decision block 424 is taken and the method returns to block 402 where the BMU monitors the state of cell blocks in the battery cell stack. If either a cell block at the top of charge in the battery cell stack has a voltage delta with another cell block in the battery cell stack that is greater than the predetermined threshold for determining a battery cell stack failure as determined in decision block 420, the voltage change for a particular cell block is changing over time in as determined in decision block 422, or a single cell block's discharge rate is greater than the discharge rate threshold as determined in decision block 424, then the "YES" branch of the respective decision block is taken, an action or alert is issued based upon the identifying event in block 426, and the method returns to block 402.

Figure 5:
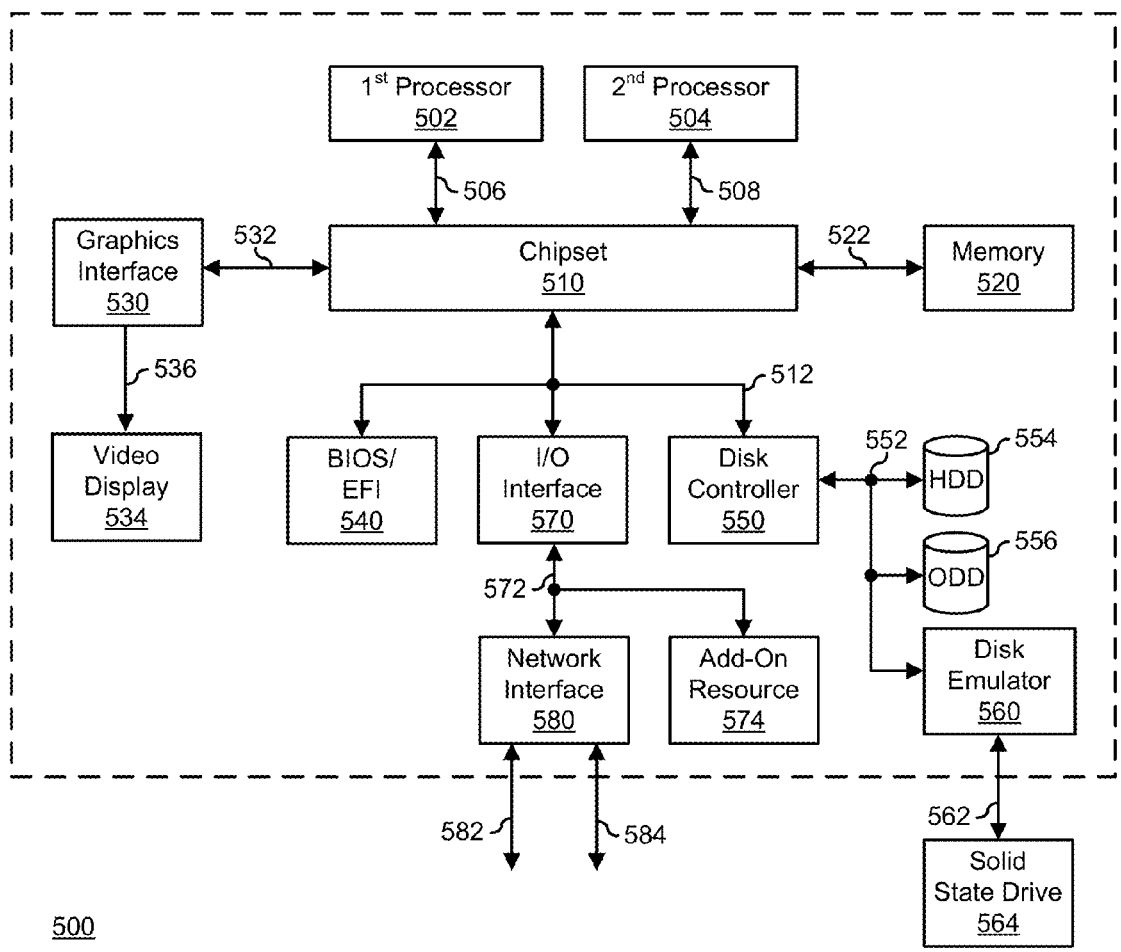
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be coupled to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A battery management unit comprising:
a cell balancing module programmed to perform cell balancing between a first battery cell of a plurality of battery cells in a battery cell stack and a second battery cell of the plurality of battery cells, wherein in performing the cell balancing, the cell balancing module is further programmed to:
charge the first battery cell and the second battery cell until a first one of the first or second battery cells is charged to an over-voltage threshold;
determine if the other one of the first or second battery cells is charged to less than an over-voltage hysteresis threshold, wherein the over-voltage hysteresis threshold is less than the over-voltage threshold;
halt the charging of the first battery cell and the second battery cell in response to determining that the other one of the first or second battery cells is charged to less than a voltage hysteresis threshold; and
discharge the first one of the first or second battery cells to the overvoltage hysteresis threshold; and
a controller programmed to:
determine, during a first charge cycle of the battery cell stack, that the first battery cell has reached the over-voltage threshold before the second battery cell;
determine, during a discharge cycle of the battery cell stack, that the first battery cell has reached an under-voltage threshold before the second battery cell;
identify the first battery cell as having a lower capacity than the second battery cell based upon the determination that the first battery cell reached the over-voltage threshold before the second battery cell and upon the determination that the first battery cell reached the under-voltage threshold before the second battery cell; and
prevent, during a second charge cycle, the cell balancing module from performing cell balancing on the battery cell stack based upon the first battery cell being identified as having the lower capacity than the second battery cell.

2. The battery management unit of claim 1, further comprising:
a memory including a cell charge history table that stores state of charge information for the plurality of battery cells;
wherein the controller is further programmed to:
store a first entry in the cell charge history table, the first entry indicating a first state of charge of the first battery cell when the first battery cell reached the over-voltage threshold, and including a first timestamp; and
store a second entry in the cell charge history table, the second entry indicating a second state of charge of the first battery cell when the first battery cell reached the under-voltage threshold, and including a second timestamp; and
wherein identifying the first battery cell as having the lower capacity is further based upon the first entry and the second entry.

3. The battery management unit of claim 2, wherein the second entry further indicates that the first cell has the lower capacity.

4. The battery management unit of claim 2, wherein the controller is further programmed to:
Determine, during the first charge cycle, that the second battery cell has not reached the over-voltage hysteresis threshold in response to determining that the first battery cell has reached the over-voltage threshold; and
direct, during the first charge cycle, the cell balancing module to perform cell balancing on the first battery cell in response to determining that the second battery cell has not reached the over-voltage hysteresis threshold.

5. The battery management unit of claim 4, wherein the controller is further programmed to:
store a third entry in the cell charge history table, the third entry indicating a third state of charge of the second battery cell when the first battery cell reached the over-voltage threshold, and including a third timestamp;
wherein directing the cell balancing module to perform cell balancing on the first battery cell is in further response to the third entry.

6. The battery management unit of claim 2, wherein:
the controller includes a communication port and an alert output; the battery management unit is coupled to a host system; and
the controller is further programmed to communicate the first entry and the second entry to the host system via the communication port.

7. The battery management unit of claim 6, wherein the controller is further programmed to provide an alert to the host system on the alert output, the alert indicating that the controller prevented the cell balancing module from performing cell balancing on the first battery cell.

8. The battery management unit of claim 1, wherein the controller is further programmed to:
determine, during a third charge cycle of the battery cell stack, that the first battery cell and the second battery cell have reached the over-voltage threshold before a third battery cell of the plurality of battery cells;
determine, during the third charge cycle, that the third battery cell has not reached the over-voltage hysteresis threshold in response to determining that the first battery cell and the second battery cell have reached the over-voltage threshold; and
direct, during the third charge cycle, the cell balancing module to perform cell balancing on the first battery cell and the second battery cell in response to determining that the third battery cell has not reached the over-voltage hysteresis threshold.

9. A battery management unit comprising:
a cell balancing module programmed to perform cell balancing between a first battery cell of a plurality of battery cells in a battery cell stack and a second battery cell of the plurality of battery cells, wherein in performing the cell balancing, the cell balancing module is further programmed to:

charge the first battery cell and the second battery cell until a first one of the first or second battery cells is charged to an over-voltage threshold;

determine if the other one of the first or second battery cells is charged to less than an over-voltage hysteresis threshold, wherein the over-voltage hysteresis threshold is less than the over-voltage threshold;

halt the charging of the first battery cell and the second battery cell in response to determining that the other one of the first or second battery cells is charged to less than a voltage hysteresis threshold; and discharge the first one of the first or second battery cells to the over-voltage hysteresis threshold;

a memory including a cell charge history table that stores state of charge information for the plurality of battery cells; and a controller programmed to:

determine, during a first charge cycle of the battery cell stack, that the first battery cell has reached the over-voltage threshold before the second battery cell;

store a first entry in the cell charge history table, the first entry to indicate a first state of charge of the first battery cell when the first battery cell reached the over-voltage threshold, and to include a first timestamp;

determine, during a discharge cycle of the battery cell stack, that the first battery cell has reached an under-voltage threshold before the second battery cell;

store a second entry in the cell charge history table, the second entry to indicate a second state of charge of the first battery cell when the first battery cell reached the under-voltage threshold, to indicate that the first cell has the lower capacity, and to include a second timestamp;

identify the first battery cell as having a lower capacity than the second battery cell based upon the first entry and the second entry; and prevent, during a second charge cycle, the cell balancing module from performing cell balancing on the battery cell stack based upon the first battery cell being identified as having the lower capacity than the second battery cell.

10. The battery management unit of claim 9, wherein the controller is further programmed to:

determine, during the first charge cycle, that the second battery cell has not reached the over-voltage hysteresis threshold in response to determining that the first battery cell has reached the over-voltage threshold; and direct, during the first charge cycle, the cell balancing module to perform cell balancing on the first battery cell in response to determining that the second battery cell has not reached the over-voltage hysteresis threshold.

11. The battery management unit of claim 10, wherein the controller is further programmed to:

store a third entry in the cell charge history table, the third entry indicating a third state of charge of the second battery cell when the first battery cell reached the over-voltage threshold, and including a third timestamp;

wherein directing the cell balancing module to perform cell balancing on the first battery cell is in further response to the third entry.

12. The battery management unit of claim 9, wherein:

the controller includes a communication port and an alert output; the battery management unit is coupled to a host system; and the controller is further programmed to communicate the first entry and the second entry to the host system via the communication port.

13. The battery management unit of claim 12, wherein the controller is further programmed to provide an alert to the host system on the alert output, the alert indicating that the controller prevented the cell balancing module from performing cell balancing on the first battery cell.

14. The battery management unit of claim 9, wherein the controller is further programmed to:

determine, during a third charge cycle of the battery cell stack, that the first battery cell and the second battery cell have reached the over-voltage threshold before a third battery cell of the plurality of battery cells;

determine, during the third charge cycle, that the third battery cell has not reached the over-voltage hysteresis threshold in response to determining that the first battery cell and the second battery cell have reached the over-voltage threshold; and direct, during the third charge cycle, the cell balancing module to perform cell balancing on the first battery cell and the second battery cell in response to determining that the third battery cell has not reached the over-voltage hysteresis threshold.

15. A battery management unit comprising:

a cell balancing module programmed to perform cell balancing between a first battery cell of a plurality of battery cells in a battery cell stack and a second battery cell of the plurality of battery cells, wherein in performing the cell balancing, the cell balancing is further programmed to:

charge the first battery cell and the second battery cell until a first one of the first or second battery cells is charged to an over-voltage threshold;

determine if the other one of the first or second battery cells is charged to less than an over-voltage hysteresis threshold, wherein the over-voltage hysteresis threshold is less than the over-voltage threshold;

halt the charging of the first battery cell and the second battery cell in response to determining that the other one of the first or second battery cells is charged to less than a voltage hysteresis threshold; and discharge the first one of the first or second battery cells to the over-voltage hysteresis threshold;

a memory including a cell charge history table that stores state of charge information for the plurality of battery cells; and a controller programmed to:

determine, during a first charge cycle of the battery cell stack, that the first battery cell has reached the over-voltage threshold before the second battery cell;

determine, during the first charge cycle, that the second battery cell has not reached the over-voltage hysteresis threshold in response to determining that the first battery cell has reached the over-voltage threshold;

direct, during the first charge cycle, the cell balancing module to perform cell balancing on the first battery cell in response to determining that the second battery cell has not reached the over-voltage hysteresis threshold;

store a first entry in the cell charge history table, the first entry indicating a first state of charge of the first battery cell when the first battery cell reached the over-voltage threshold, and including a first timestamp;

determine, during a discharge cycle of the battery cell stack, that the first battery cell has reached an under-voltage threshold before the second battery cell;

store a second entry in the cell charge history table, the second entry indicating a second state of charge of the first battery cell when the first battery cell reached the under-voltage threshold, and including a second timestamp;

identify the first battery cell as having a lower capacity than the second battery cell based the first entry and the second entry; and prevent, during a second charge cycle, the cell balancing module from performing cell balancing on the battery cell stack based upon the first battery cell being identified as having the lower capacity than the second battery cell.

16. The battery management unit of claim 15, wherein the controller is further programmed to:

store a third entry in the cell charge history table, the third entry indicating a third state of charge of the second battery cell when the first battery cell reached the over-voltage threshold, and including a third timestamp;

wherein directing the cell balancing module to perform cell balancing on the first battery cell is in further response to the third entry.

17. The battery management unit of claim 15, wherein:

the controller includes a communication port and an alert output; the battery management unit is coupled to a host system; and the controller is further programmed to communicate the first entry and the second entry to the host system via the communication port.

18. The battery management unit of claim 17, wherein the controller is further programmed to provide an alert to the host system on the alert output, the alert indicating that the controller prevented the cell balancing module from performing cell balancing on the first battery cell.

19. The battery management unit of claim 15, wherein the controller is further programmed to:

determine, during a third charge cycle of the battery cell stack, that the first battery cell and the second battery cell have reached the over-voltage threshold before a third battery cell of the plurality of battery cells;

determine, during the third charge cycle, that the third battery cell has not reached the over-voltage hysteresis threshold in response to determining that the first battery cell and the second battery cell have reached the over-voltage threshold; and direct, during the third charge cycle, the cell balancing module to perform cell balancing on the first battery cell and the second battery cell in response to determining that the third battery cell has not reached the over-voltage hysteresis threshold.

* * * * *